May 28, 1957   H. L. PFAFFHAUSEN   2,793,815
PROTECTIVE SYSTEMS FOR ELECTRICAL TEMPERATURE INDICATORS
Filed Aug. 5, 1952   2 Sheets-Sheet 1
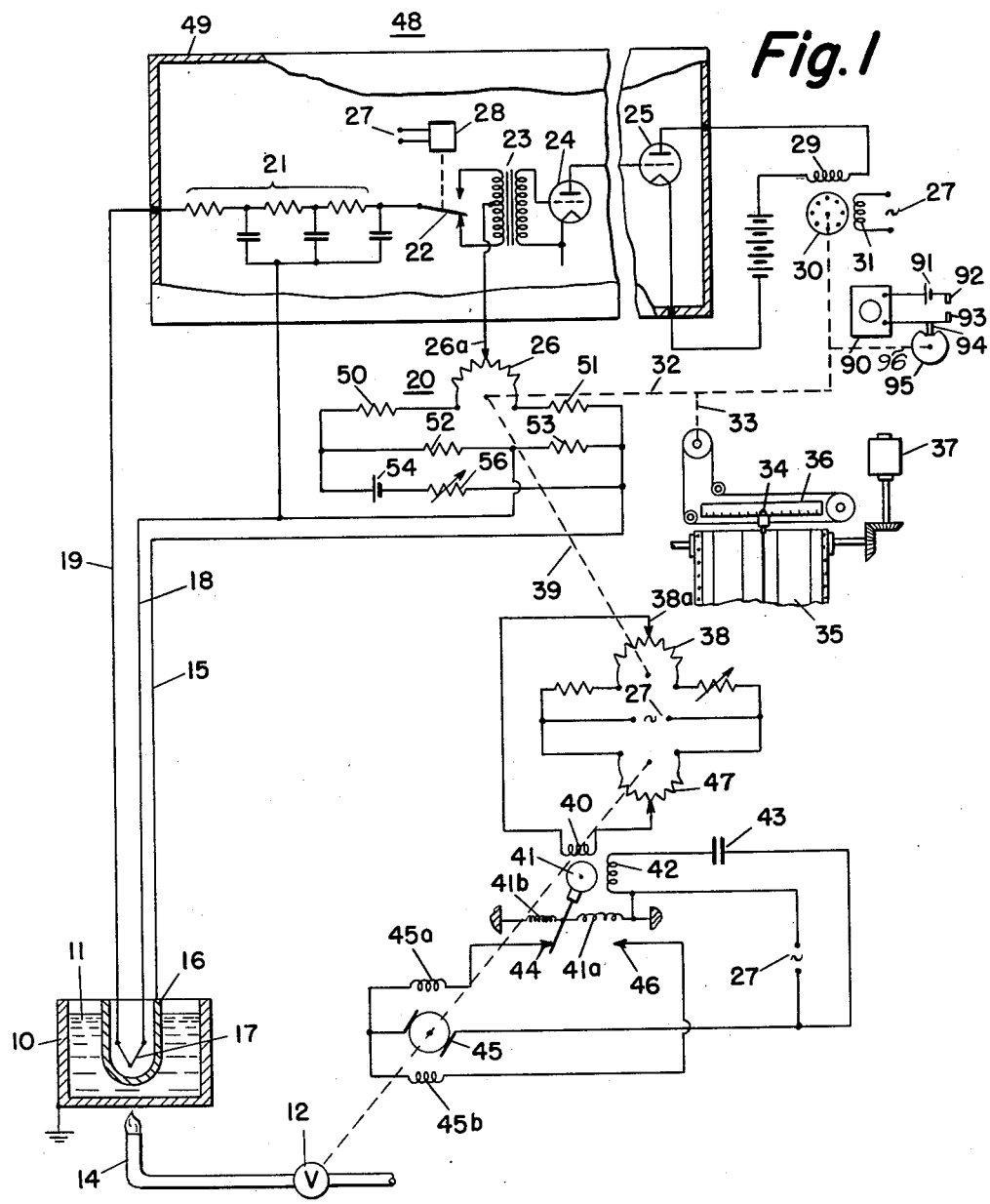
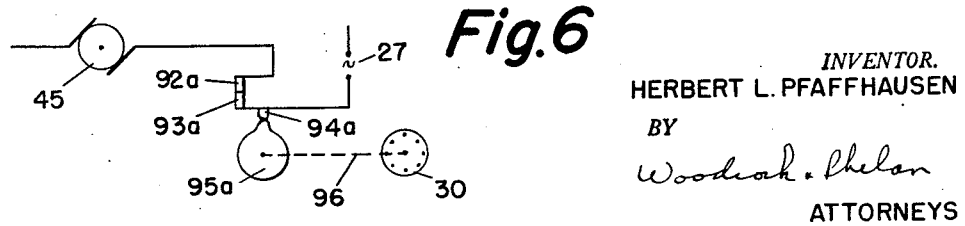
INVENTOR.
HERBERT L. PFAFFHAUSEN
BY
Woodcock & Phelan
ATTORNEYS May 28, 1957     H. L. PFAFFHAUSEN     2,793,815
PROTECTIVE SYSTEMS FOR ELECTRICAL TEMPERATURE INDICATORS
Filed Aug. 5, 1952     2 Sheets-Sheet 2
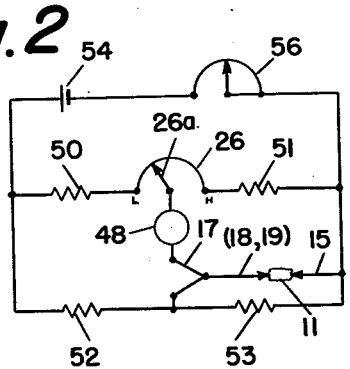
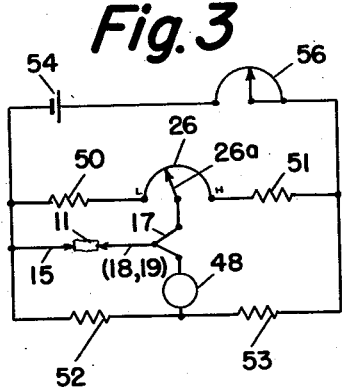
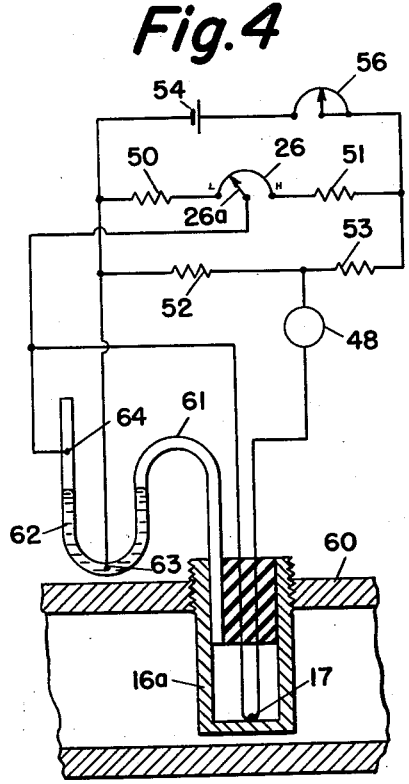
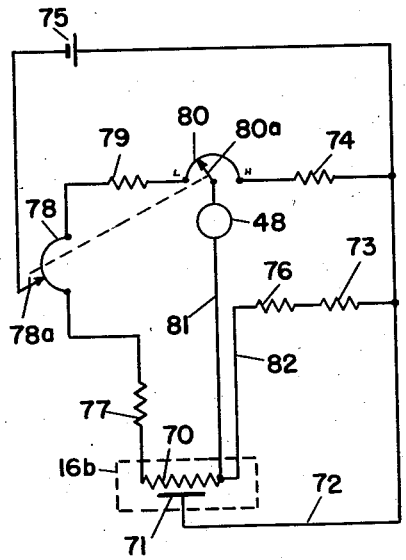
INVENTOR.
HERBERT L. PFAFFHAUSEN
BY
*Woodcock and Phelan*
ATTORNEYS

2,793,815

PROTECTIVE SYSTEMS FOR ELECTRICAL TEMPERATURE INDICATORS

Herbert L. Pfaffhausen, Glenside, Pa., assignor to Leeds and Northrup Company, Philadelphia, Pa., a corporation of Pennsylvania Application August 5, 1952, Serial No. 302,755

17 Claims. (Cl. 236—69)

This invention relates to measuring and/or control systems which include condition-responsive means and particularly to systems of the type which may include a control-modifying means effective upon failure of the condition-responsive means to perform its expected controlling function.

As explained in Wunsch Patent No. 2,153,222, it is old to provide protective arrangements which effectively monitor the measuring circuit, and upon the occurrence of an open circuit, as the open-circuiting of a thermocouple, the final control element is operated in a safe sense. While systems of the type shown in said patent have been satisfactory, they do not provide protection against other types of failures such, for example, in the protecting tube normally provided to house the thermocouple or other condition-responsive device.

In accordance with the present invention there is provided a protective circuit which becomes effective upon failure of the protecting tube housing the condition-responsive device to operate the control system in a safe sense, that is, in a direction to decrease the temperature for a heating system and to decrease the cooling in a refrigeration system.

In carrying out the present invention in one form thereof, there is provided a protective circuit including the protecting tube and the thermocouple which is completed upon failure of the protecting tube, as through the bath or other conductive medium whose temperature is under measurement and which is physically isolated from the thermocouple by the protective tube. In another form of the invention, the protective circuit is completed upon failure of the protecting tube in response to a change of conditions within the tube resulting from its failure. In either case, the protective circuit applies a voltage to cause operation of the control system in the safe sense, that is, to change the controlled variable in the direction which will prevent damage of any kind. In addition, signaling means either visible or audible, may be operated upon closing of the protective circuit to indicate failure of the protective housing of the condition-responsive device.

For further objects and advantages of the invention, reference is to be had to the following detailed description taken in conjunction with the accompanying drawings, in which:

Fig. 1 diagrammatically illustrates one form of the invention;

Fig. 2 is an elementary fractional diagram of a portion of Fig. 1;

Fig. 3 is an elementary fractional diagram of the same type as Fig. 2;

Fig. 4 illustrates the invention as applied to a non-conductive medium protected by a sheath from the temperature-measuring device;

Fig. 5 illustrates the invention as applied to a condition-responsive device other than the thermocouple, and Fig. 6 illustrates a further modification of the invention applicable to Fig. 1.

Referring to Fig. 1, the invention has been shown as applied to a system for controlling the temperature within a vessel 10 which, for example, may be a crucible or pot containing a molten material 11 such as aluminum, zinc, glass or various salts such as barium chloride or potassium cyanide. The temperature of the molten material 11 is regulated as by the adjustment of a fuel-controlling valve 12 for the burner 14. A conductor 15 is connected at one end to an electrically conductive protective housing 16 surrounding the temperature-measuring device shown as a thermocouple 17. The protecting tube frequently referred to as a thermocouple well prevents contact of the molten bath with the thermocouple 17. The importance of the present invention will be readily understood upon consideration of a molten bath 11 of zinc. Temperature control of molten zinc is important because of the solubility of contaminants in molten zinc as a function of temperature. For every temperature rise above 920° F. the solubility of contaminants in zinc rapidly increases. The solubility for such contaminants doubles itself for every temperature rise of 20° F. above the aforesaid level of 920°. Upon failure of the protecting tube 16, molten zinc will flow into the thermocouple well or protective tube 16, and there will appear therein a level of zinc well above the measuring junction illustrated adjacent the bottom of the thermocouple well 16, but insulated therefrom. The flow of the molten zinc into the thermocouple well 16 does not short-circuit or otherwise prevent the response of the temperature-sensitive device. Instead of the measuring junction being located adjacent the lower end of the thermocouple well 16, the measuring junctions then appear at the level of the molten zinc within thermocouple well 16. Those measuring junctions are then in a region which is cooler than the metal in the bath both due to the cooling of the surface of the bath due to contact with air, and also cooler because of fluxes which float on the bath and which are at a lower temperature than deeper portions of the bath. Accordingly, the control system will continue to respond in a direction to increase the application of heat to the vessel 10 materially to raise the temperature of the zinc above the desired level of 920° F.

In accordance with the present invention, the protective circuit, including conductor 15 and the thermocouple well 16 which is electrically conductive, also includes thermocouple leads 18 and 19.

The manner in which the protective circuit functions will be explained in greater detail after a brief description of the measuring system and the control system associated therewith.

The thermocouple lead 18 is connected to a split-circuit potentiometer 20, while the lead 19 is connected through a filter 21 to a converter 22 and by way of input transformer 23 to an amplifier having an input circuit illustrated as including a vacuum tube 24 and an output power tube 25. The detector-amplifier 48 as a whole has been illustrated as contained in a shielded case 49.

The difference between the voltage developed by the thermocouple 17 and that introduced into the measuring circuit by a slidewire or variable resistor 26 of the potentiometer 20 appears across the input circuit of the amplifier. That difference voltage being of unidirectional character is converted by vibrator or converter 22 and transformer 23 to alternating current. The filter 21 is designed to attenuate alternating current, particularly within the frequency range of the alternating-current supply 27 to which the operating coil 28 is connected. The alternating-current source 27 may be of commercial frequency of, say, 60 cycles per second, and in such a case there is produced in the output circuit of the power tube 25 an alternating current of 60 cycles which flows through the control winding 29 of a motor 30, the power winding 31 being connected to the same source of supply. With each change of temperature of the molten bath 11 there will be a change in the output voltage of thermocouple 17. Accordingly, a difference voltage will appear at the input of the amplifier, and the control winding 29 will be energized to operate the motor 30 in a direction relatively to rotate the slidewire 26 and its associated contact 26a in a direction to reduce that difference. Through the mechanical connections indicated by the broken lines 32 and 33, a pen-index 34 is moved across a recording chart 35 and along a scale 36 to provide continuous indication and a record of the temperature of bath 11. The chart 35 may be driven by any suitable means, as by a constant speed motor 37.

For further details of the measuring system thus far described, reference may be had to Williams Patent No. 2,113,164.

The control system may be of any suitable type, such as shown in Davis Patent No. 2,300,537 (particularly Fig. 1). For simplicity, however, it has been shown in the present application as comprising a variable resistor or slidewire 38 driven by motor 30 as through a mechanical connection 39. The slidewire 38 and slidewire 47 each forms a part of a Wheatstone bridge connected to the alternating-current source of supply 27. Upon relative movement between slidewire 38 and its associated contact 38a there is applied a voltage to a relay coil 40 of a relay 41 of the wattmeter or induction type and having a power winding 42 connected through capacitor 43 to the alternating-current source of supply 27. If the unbalance is in one direction due to rotation in one direction of slidewire 38, the relay will be operated against the bias of centering springs 41a and 41b to complete a circuit through one of its contacts, and if the unbalance is in the opposite direction, it will complete a circuit through the other of its contacts.

As illustrated, a circuit is completed from one side of the source of supply 27 through the spring 41a, the movable contact of relay 41, its stationary contact 44, motor field winding 45a of motor 45, its armature, and thence to the other side of the source of supply 27, for operation of the motor 45, slidewire 47 and of the valve 12 in one direction. When the relay 41 is moved to complete a connection through its other stationary contact 46, winding 45a is deenergized, and the other motor winding 45b is energized for reverse rotation of the motor to operate the valve 12 and slidewire 47 in the opposite direction. Accordingly, the motor 45 rotates the valve 12 in a direction to change the controlled variable in a desired direction and in the drawing to increase or decrease the supply of fuel to burner 14, thereby elevating or decreasing the heat input to the molten bath 11.

Referring again to the measuring system, particularly the split-circuit potentiometer 20, it is sufficient to say that it is of conventional type and in addition to slidewire 26 includes resistors 50 and 51, sometimes referred to as "end coils," resistors 52 and 53, a battery 54, and a rheostat 56 in series therewith.

With the above understanding of the system as a whole, reference may now be had to Fig. 2 which is a simplified diagram of Fig. 1.

In accordance with the present invention, flow of the molten bath 11 into the thermocouple well 16 completes an electrical circuit between conductor 15 and one or both of conductors 18 and 19. In Fig. 2 both reference characters (18, 19) identify a wire shown connected to the measuring junction of thermocouple 17, while the conductor 15 is shown connected to the juncture between resistors 51 and 53, as in Fig. 1. If it be assumed that the measuring system of Fig. 2 is in balance, that is, that the potential introduced by slidewire 26 is equal and opposite to that developed by thermocouple 17, there will be zero current flowing through the detector 48. Stated differently, the voltage of thermocouple 17 will be opposed by a potential difference introduced by the position of contact 26a on slidewire 26 equal and opposite to it. If, under such circumstances, there is a failure of the thermocouple well 16 and molten metal appears as illustrated at 11 in Fig. 2, the potential balance will change. Viewed from the current standpoint, current flowing from battery 54 through resistor 50 will divide at the slidewire 26, a part flowing through resistor 51 and a part flowing downwardly through the detector-amplifier 48, through thermocouple 17, leads 18 and/or 19, the molten metal 11 and by way of conductor 15 and rheostat 56 to the other side of battery 54. The change in the potential balance or from the current standpoint, the flow of current through the detector-amplifier 48 will, Fig. 1, energize motor 30 in the same direction as occurs upon an increase in the temperature of thermocouple 17 and, accordingly, causes rotation of control slidewire 38 relative to its contact 38a in a direction to energize the relay 41 for energization of motor 45 in a direction to close the valve 12. Thus, the appearance of molten metal 11 in thermocouple well 16 causes operation of the control system in the safe sense, i. e., to reduce the temperature of the bath 11.

In Fig. 3 the parts are the same as in Fig. 2; however, the relative positions of the detector-amplifier 48 and the thermocouple 17 have been interchanged. The interchange of their positions in the branch circuit between slidewire 26 and the junction between resistors 52 and 53 requires the reversal of polarity of the battery 54 and that the protective circuit shall extend to the junction between resistors 50 and 52 instead of the junction between resistors 51 and 53, as in Figs. 1 and 2. The change in the location of the protective circuit and the change in the polarity of the connection of battery 54 are necessary because the potential distribution, upon appearance of molten metal between conductors 15 and one or both of conductors 18 and 19 with the detector-amplifier 48 located as in Fig. 3, requires the connection to the junction between resistors 50 and 52. With a rise in temperature of thermocouple 17, current will flow in an upward direction through detector-amplifier 48 as viewed in Fig. 3. Also, upon appearance of molten metal as illustrated at 11, Fig. 3, current will flow upwardly through detector-amplifier 48 and through the path including the molten metal 11 and through the path including resistor 52. Thus, the effect upon a break in the thermocouple well is the same as the appearance of a high temperature, and the valve 12 is moved toward closed position.

In the event the thermocouple well 16 is of material electrically non-conductive, the conductor 15 may be extended downwardly into thermocouple well 16 and to function in the same manner as the conductive well 16 of Fig. 1.

Referring now to Fig. 4, corresponding parts have the same reference characters as in Figs. 1–3, the principal difference being in the thermocouple well 16a which may be either electrically conductive or non-conductive, and it may extend through the wall 60 of a vessel or of a flow channel into good thermal relationship with a medium contained therein which is under pressure and which may be electrically non-conductive. Whether thermocouple well 16a be of electrically conductive or non-conductive material the thermocouple 17 may contact the thermocouple well 16a. However, if the thermocouple well 16a be conductive, tube 61 must be non-conductive or insulated from the thermocouple well 16a. Upon failure of the thermocouple well 16a, the pressure of the medium within the vessel or flow channel 60 is applied through a tube 61 to a conductive liquid 62 disposed in a liquid trap forming a manometer. Upon application of pressure to one end of the manometer, the liquid rises to complete a circuit between a contact 63 and a contact 64 to complete the same protective circuit as already described in Fig. 3. As desired, the end of the manometer above contact 64 may be open or closed.

The invention is not limited to thermocouples but may be applied to temperature-responsive devices of other types such, for example, as the resistance thermometer 70 of Fig. 5. In Fig. 5 there is illustrated a measuring system which is of conventional type for the measurement of temperature as a result of change in the resistance of the resistor 70 and which is generally referred to as a resistance thermometer. To the conventional measuring circuit there has been added a sensing conductor 71 located adjacent the resistor 70 but insulated therefrom, both being located within a protective housing 16b. The element 71 is connected to the measuring circuit by conductor 72 and to the junction between resistors 73 and 74 forming a part of a Wheatstone bridge supplied from any suitable source, either alternating current or direct current and shown in Fig. 5 as a battery 75. The arm of the bridge including resistor 73 preferably includes a second resistor 76. A second arm of the bridge includes the resistance thermometer 70, a resistor 77 and a part of a slidewire 78 having an adjustable contact 78a. A third arm of the bridge includes the remaining portion of slidewire 78 and a resistor 79 and a part of a slidewire 80 having an adjustable contact 80a. The fourth and remaining arm of the bridge includes the remaining portion of slidewire 80 and resistor 74. The detector-amplifier 48 is connected between contact 80a and one end of resistance thermometer 70, the use of the two leads 81 and 82 to the same point on thermometer 70 being conventional practice in the measuring art. If housing 16b is electrically conductive then element 71 may be omitted and conductor 72 connected to housing 16b.

The advantages of the system of Fig. 5 include the response of the system not only to the occurrence of an open circuit in the resistance thermometer 70, but also upon a completion of an electrical circuit between that resistance thermometer and the element 71, or between the latter and either of the leads of the resistance thermometer 70. Taking the first example, if the resistor 70 becomes open-circuited, the Wheatstone bridge will be unbalanced because of the increase in resistance of the arm including the resistor 77 and a portion of slidewire 78. The unbalance will be in the same direction as produced by a rise in the temperature of the resistance thermometer 70, and thus the associated control system which may be identical with that shown in Fig. 1 will respond to move valve 12 toward closed position. Taking now a second example, if a circuit is completed between element 71 and any or all conductors connected to resistor 70, it will be seen that at least the resistors 73 and 76 will be effectively short-circuited by way of conductor 72. However, the reduction in the resistance of that arm of the bridge leaves the resistance value of the arm including at least resistor 77 and a part of slidewire 78 higher than the resistance value of the branch now including conductor 72 and thus the network responds as though there had been an increase in temperature of the resistance thermometer 70. Accordingly, the detector-amplifier again functions to operate the valve 12 toward closed position.

While thus far the invention has been described in connection with automatic control apparatus, it is to be understood that the invention is not limited to automatic control systems but is also applicable to systems monitoring the manual control of heating or cooling media. In order to monitor the measuring system and notify the operator of the failure of the protective housing of the condition-responsive device, there may be provided signalling means either visible or audible conditioned upon closure of the protective circuit. An example of a signalling arrangement has been illustrated in Fig. 1. There is provided an indicating member 90 which has been generically illustrated; however, it may comprise visible or audible signaling means connected in circuit with a battery 91 and a pair of normally open contacts 92, 93. Contact 93 has been illustrated as a movable contact having associated therewith a cam follower 94. Cam follower 94 cooperates with a notched disc or cam 95 to close contacts 92 and 93 upon closing of the protective circuit thereby operating the alarm member 90 thus indicating a failure of the protective housing of the condition-responsive device. The notched disc 95 may be actuated by a mechanical connection 96 driven by balancing motor 30. The notch in disc 95 is so constructed as to admit of limited departure of the magnitude of the controlled condition from the control point without closing contacts 92 and 93. However, upon further deviation from the control point or upon failure of the protective housing of the condition-responsive device, the cam 95 will engage cam follower 94 to close contacts 92 and 93 thereby completing the alarm circuit. It will be noted that cam 95 is so constructed that it will effect closure of contacts 92 and 93 upon deviation of the magnitude of the controlled condition from the control point in either direction. When the control point is to be changed, the cam 95 may be rotated about the shaft or mechanical connection 96 in a direction to compensate for the desired change in the control point. The cam 95 will then be locked to the shaft 96 in that position to again effect selective closure of the alarm circuit as previously described. When manual control is employed, all of the apparatus illustrated in Fig. 1 below mechanical connection 39 and above valve 12 may be omitted and the valve controlled manually. While the alarm system has been illustrated in connection with Fig. 1, it is to be understood that it is also applicable to the various other modifications disclosed herein.

While the foregoing description has primarily dealt with decreasing temperature of heated materials upon failure of the protective housing of the condition-responsive device, in some applications, notably in glass furnaces, it is necessary that upon failure of the protective housing the glass shall not be allowed to congeal. In such instances to insure that the glass does not congeal it is preferable to provide for an increase in temperature. To accomplish this result it is only necessary to modify the connections shown in the drawings by connecting conductor 15 to the opposite end of the potentiometer circuit. For example, referring to Figs. 1 and 2, conductor 15 would be transferred from the junction of resistors 51 and 53 to the junction of resistors 50 and 52. Similarly in Fig. 3, conductor 15 would be transferred from the junction between resistors 50 and 52 to the junction between resistors 51 and 53.

In some applications rather than to increase or decrease the magnitude of the controlled condition as a result of a failure of the protective housing of the condition-responsive device it may be preferable to leave the control member (e. g. valve 12) at its then existing position. Accordingly, there has been shown in Fig. 6 an arrangement whereby the valve operating motor 45 of Fig. 1 may be disconnected from its power supply 27 upon occurrence of a failure of the protective housing 16. In order to effect deenergization of motor 45 there may be provided a cam 95a driven from balancing motor 30 by way of mechanical connection 96. The cam 95a has been shown as being provided with a raised portion, corresponding to the notch in cam 95, for cooperating with a cam follower 94a to effect opening of the normally closed contacts 92a and 93a which are in circuit with motor 45 and power supply 27. When the cam 95a is rotated from its normal or control position as illustrated in Fig. 6, the cam projection will be rotated to one side or the other of cam follower 94a thus permitting contacts 92a and 93a to open thereby deenergizing motor 45 and leaving valve 12 in its then existing position. While either the signal arrangement illustrated in Fig. 1 or the automatic control disabling arrangement illustrated in Fig. 6 may be used separately, it is preferable to use both arrangements in order to notify the operator of the failure of the protective housing of the condition-responsive device in order that such failure may be corrected without undue delay.

While several preferred embodiments of the invention have been described, it is to be understood that further modifications may be made within the spirit and scope of the appended claims.

What is claimed is:

1. A control system comprising a condition-responsive device having an electrical characteristic the magnitude of which is changed in response to the change in magnitude of the condition, a protective housing enclosing said device, a measuring network unbalanced by change in said electrical characteristic of said device, control apparatus operable upon unbalance of said measuring network for varying the magnitude of said condition in a selected direction, and a normally open protective circuit connected between said protective housing and impedance means of said measuring network, said normally open protective circuit being operable to closed position upon failure of said protective housing to modify the effective value of said impedance means by completing said protective circuit so as to unbalance said measuring network in a direction to operate said control apparatus in a safe sense.

2. The combination set forth in claim 1 in which said condition-responsive device is a thermocouple and in which said protective circuit is completed by flow of a conductive medium through the protective housing into circuit-completing relation with said thermocouple.

3. The combination set forth in claim 1 in which said condition-responsive device is a resistance thermometer and in which said measuring network is a Wheatstone bridge, said protective circuit being completed upon failure of said protective housing to reduce the resistance of an arm of the Wheatstone bridge producing operation of the control system in a safe sense and in the same direction as the appearance of an open circuit in said resistance thermometer.

4. The combination set forth in claim 1 in which said protective circuit includes said protective housng and a medum whose temperature is to be controlled both said housing and said medium being electrically conductive.

5. The combination set forth in claim 1 in which said protective circuit includes a conductor disposed within said housing in electrically insulated relation with respect to said device and which is completed upon flow into said housing of an electrically conductive medium whose temperature is under control.

6. The combination set forth in claim 1 in which said normally open protective circuit includes a conductor connected to said protective housing and to said impedance means.

7. The combination set forth in claim 4 wherein said normally open protective circuit includes at least one of the leads to said condition-responsive device and a separate conductor electrically connected to the exterior of said protective housing and to said measuring network.

8. A measuring system comprising a condition-responsive device having an electrical characteristic the magnitude of which is changed in response to the change in magnitude of the condition, a protective housing enclosing said condition-responsive device, a measuring network unbalanced by change in said electrical characteristic of said device, a normally open protective circuit connected between said protective housing and impedance means of said measuring network, said normally open protective circuit being operable to closed condition upon failure of said protective housing to modify the effective value of said impedance means by completing said protective circuit so as to unbalance said measuring network, and means operable upon completing said protective circuit to indicate failure of said protective housing.

9. The combination set forth in claim 8 in which said condition-responsive device is a thermocouple and in which said protective circuit is completed by flow of a conductive medium through the protective housing into circuit-completing relation with said thermocouple.

10. The combination set forth in claim 8 in which said condition-responsive device is a resistance thermometer and in which said measuring network is a Wheatstone bridge, said protective circuit being completed upon failure of said protective housing to reduce the resistance of an arm of the Wheatstone bridge.

11. The combination set forth in claim 8 in which said protective circuit includes said protective housing and a medium whose temperature is to be monitored, both said housing and said medium being electrically conductive.

12. The combination set forth in claim 8 in which said protective circuit includes a conductor disposed within said housing in electrically insulated relation with respect to said device and which is completed upon flow into said housing of an electrically conductive medium whose temperature is being monitored.

13. A control system comprising a network, means for producing an electrical effect varying with changes in magnitude of a condition, electro-responsive means in circuit with said network, means controlled by said electro-responsive means normally to maintain a predetermined magnitude of said condition, safety means comprising a normally open electrical circuit effective in said network for modifying the potential between selected points of said network upon completion of said normally open circuit, a protective housing for said first-named means, and means for completing said normally open circuit upon failure of said protective housing.

14. A monitoring system comprising a balanceable network, means for producing an electrical effect varying with changes in magnitude of a condition, electro-responsive means in circuit with said network, means controlled by said electro-responsive means normally to maintain balance of said network, safety means comprising a normally open electrical circuit effective in said network for modifying the potential between selected points of said network upon completion of said normally open circuit, a protective housing for said first-named means, and means for completing said normally open circuit upon failure of said protective housing to produce unbalance of said network.

15. A system according to claim 14 wherein said electro-responsive means effects a selective control to limit departure from a predetermined magnitude of said condition.

16. A system according to claim 14 wherein said electro-responsive means effects a selective indication of a failure of said protective housing.

17. A control system comprising a condition-responsive device having an electrical characteristic the magnitude of which is changed in response to the change in magnitude of the condition, a protective housing enclosing said device, a measuring network unbalanced by change in said electrical characteristic of said device, said measuring network including a split-circuit potentiometer, a control apparatus operable upon unbalance of said measuring network for varying the magnitude of said condition in a selected direction, and a normally open protective circuit connected between said protective housing and impedance means of said potentiometer, said normally open circuit being operable to closed position upon failure of said protective housing to modify the effective value of said impedance means by completing said protective circuit so as to unbalance said measuring network in a direction to operate said control apparatus in a safe sense.

References Cited in the file of this patent

UNITED STATES PATENTS

| | | |
|---|---|---|
| 1,778,398 | Northrup | Oct. 14, 1930 |
| 2,332,432 | Busenkell | Oct. 19, 1943 |
| 2,428,568 | Hill | Oct. 7, 1947 |

FOREIGN PATENTS

| | | |
|---|---|---|
| 543,597 | Great Britain | Aug. 15, 1941 |
| 683,203 | Germany | Nov. 1, 1939 |